United States Patent
Chinnaiah Sankaran et al.

(10) Patent No.: US 9,219,671 B2
(45) Date of Patent: Dec. 22, 2015

(54) PRO-ACTIVE MPIO BASED RATE LIMITING TO AVOID ISCSI NETWORK CONGESTION/INCAST FOR CLUSTERED STORAGE SYSTEMS

(71) Applicant: Dell Products, L.P., Round Rock, TX (US)

(72) Inventors: Ananda M. Chinnaiah Sankaran, Round Rock, TX (US); Ireneusz Jan Zabka, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 14/099,500

(22) Filed: Dec. 6, 2013

(65) Prior Publication Data

US 2015/0163120 A1    Jun. 11, 2015

(51) Int. Cl.
*G06F 15/173* (2006.01)
*H04L 12/26* (2006.01)

(52) U.S. Cl.
CPC .................................. *H04L 43/0888* (2013.01)

(58) Field of Classification Search
CPC ............................ H04L 12/26; H04L 43/0888
USPC ................................... 709/203, 224; 370/235
See application file for complete search history.

(56) References Cited

U.S. PATENT DOCUMENTS

| 6,990,071 | B2 | 1/2006 | Adam et al. |
| 7,716,323 | B2 * | 5/2010 | Gole ........................ H04L 29/06 370/214 |
| 7,818,441 | B2 * | 10/2010 | Zuckerman ......... H04L 67/1097 709/223 |
| 7,920,476 | B2 * | 4/2011 | Turner .................... H04L 47/10 370/229 |
| 8,145,806 | B2 * | 3/2012 | Lee ........................ G06F 3/0611 710/36 |
| 8,374,089 | B2 | 2/2013 | Tanaka et al. |
| 8,385,201 | B2 | 2/2013 | Cohen et al. |
| 8,793,334 | B1 * | 7/2014 | Bathija ............... H04L 67/1097 707/821 |
| 9,106,545 | B2 * | 8/2015 | Chen ...................... H04L 47/10 |
| 2007/0058534 | A1 * | 3/2007 | Shimonishi ............ H04L 47/20 370/230 |
| 2009/0089462 | A1 * | 4/2009 | Strutt .................... G06F 3/0607 710/16 |
| 2013/0097309 | A1 | 4/2013 | Ma et al. |
| 2013/0124253 | A1 * | 5/2013 | Cooper ................ G06Q 10/067 705/7.26 |
| 2014/0185453 | A1 * | 7/2014 | Hwang ............... H04L 43/0864 370/236 |

* cited by examiner

*Primary Examiner* — Frantz Jean
(74) *Attorney, Agent, or Firm* — Hamilton, Brook, Smith & Reynolds, P.C.

(57) ABSTRACT

In an embodiment, a method of managing inbound throughput for at least one storage read request can include analyzing, at a server, a given storage read request to determine required network throughput at network ports of the server. Each of the storage read requests can be directed to a storage device. The method can further include queuing, at the server, the given storage read request if the required throughput of the given storage read request combined with throughput of outstanding storage read requests previously sent to the storage device saturates the available bandwidth of the network ports of the server. The method can additionally include sending the given storage request from the server to the storage device if the required throughput of the storage read request along with throughput of the outstanding read requests is below the level of available bandwidth of the network ports of the server.

20 Claims, 9 Drawing Sheets

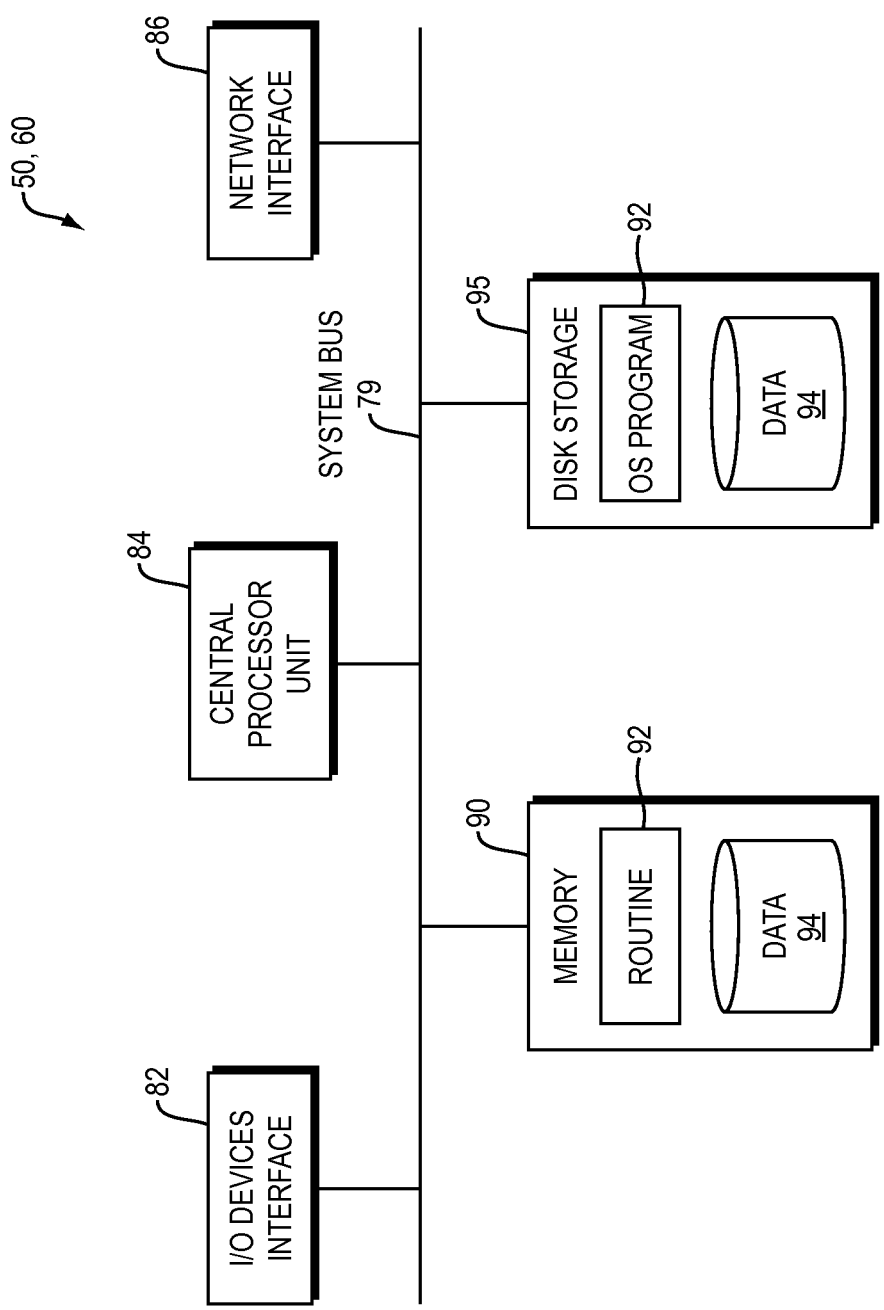

PRO-ACTIVE MPIO BASED RATE LIMITING TO AVOID ISCSI NETWORK CONGESTION/INCAST FOR CLUSTERED STORAGE SYSTEMS

BACKGROUND OF THE INVENTION

Peer or clustered storage systems, such EqualLogic provided by Dell, Inc., host volume data across multiple storage arrays, each storage array having its own network port(s). A server can issue input/output (I/O) requests to read data from the storage arrays, and the storage arrays provide the requested data. Due to the storage arrays having multiple ports, the aggregate network bandwidth from the storage arrays is higher than available bandwidth at the server. Once the throughput needed to deliver data requested by the server from the storage arrays exceeds available server bandwidth, congestion can occur on the network (e.g., when many array nodes simultaneously send data to single server node). In internet Small Computer System Interface (iSCSI)/transmission connection protocol (TCP) based storage networks, a many to one data burst can be called a "TCP incast." The switch ports attached to server become congested and need to drop frames due to buffer exhaustion. TCP congestion control on the storage arrays reacts to frame drops by reducing throughput (e.g., window size), retransmitting data and slowly increasing throughput window. TCP congestion control is based on network round trip times for timeouts and maximum window size for outstanding data. TCP congestion control is reactive (e.g., slow to respond) and causes high/low throughput fluctuations. Such reactive congestion control lowers TCP throughput, and therefore also iSCSI data throughput. In a worst case of more target arrays (e.g., a large fan-in) or more server requestors (e.g., multiple fan-in situations) it may lead to TCP (and therefore iSCSI network) throughput collapse.

SUMMARY OF THE INVENTION

In an embodiment, a method of managing inbound throughput for at least one storage read request can include analyzing, at a server, a given storage read request to determine required network throughput to return data requested by the at least one storage read request on at least one network port of the server. Each of the storage read requests can be directed to a storage device. The method can further include queuing, at the server, the given storage read request if the required throughput of the given storage read request combined with throughput of outstanding storage read requests previously sent to the storage device saturates the available bandwidth of the network ports of the server. The method can additionally include sending the given storage request from the server to the storage device if the required throughput of the storage read request along with throughput of the outstanding read requests is below the level of available bandwidth of the network ports of the server.

In an embodiment, the server can present a platform stack having a plurality of layers. A first of the layers can generate the storage read request, and a second of the layers analyzes the storage request. The second of the layers can be higher than the first of the layers in the platform stack. A third layer of the platform stack can be configured to send the storage read request to the storage device. The third layer can be higher than the first of the layers and the second of the layers in the platform stack.

In an embodiment, analyzing the storage read request can include determining required network throughput at the server and determining whether to queue the given storage read request or send the given storage read request based on a difference between maximum bandwidth of all of the network ports on the server and a current required throughput.

In an embodiment, analyzing, queuing and sending can occur in a layer before a SCSI carrier layer, such as iSCSI, and after a SCSI request layer, such as a SCSI class driver. Analyzing, queuing and sending can occur in a multi-path input/output (MPIO) layer.

In an embodiment, the storage device can be a plurality of storage devices. The method can include limiting network traffic from the plurality of storage devices, based on available bandwidth on network ports of the server, by queuing the given storage request from server.

In an embodiment, a server for managing inbound throughput for at least one storage read request can include an analysis module configured to analyze, at a server, a given storage read request to determine required network throughput to return data requested by the at least one storage read request on at least one network port of the server. Each of the storage read requests can be directed to a storage device. The server can further include a memory module configured to queue, at the server, the given storage read request if the required throughput of the given storage read request combined with throughput of outstanding storage read requests previously sent to the storage device saturates the available bandwidth of the network ports of the server. The system can further include a transmission module configured to send the given storage request from the server to the storage device if the required throughput of the storage read request along with throughput of the outstanding read requests is below the level of available bandwidth of the network ports of the server.

In an embodiment, a non-transitory computer-readable medium can be configured to store instructions for managing inbound throughput for a storage read request. The instructions, when loaded and executed by a processor, can cause the processor to analyze, at a server, a given storage read request to determine required network throughput to return data requested by the at least one storage read request on at least one network port of the server. Each of the storage read requests can be directed to a storage device. The instructions can further cause the processor to queue, at the server, the given storage read request if the required throughput of the given storage read request combined with throughput of outstanding storage read requests previously sent to the storage device saturates the available bandwidth of the network ports of the server. The instructions can further cause the processor to send the given storage request from the server to the storage device if the required throughput of the storage read request along with throughput of the outstanding read requests is below the level of available bandwidth of the network ports of the server.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a diagram of an example internal structure of a computer (e.g., client processor/device or server computers) in the computer system of FIG. 6.

DETAILED DESCRIPTION OF THE INVENTION

A description of example embodiments of the invention follows.

Figure 1:
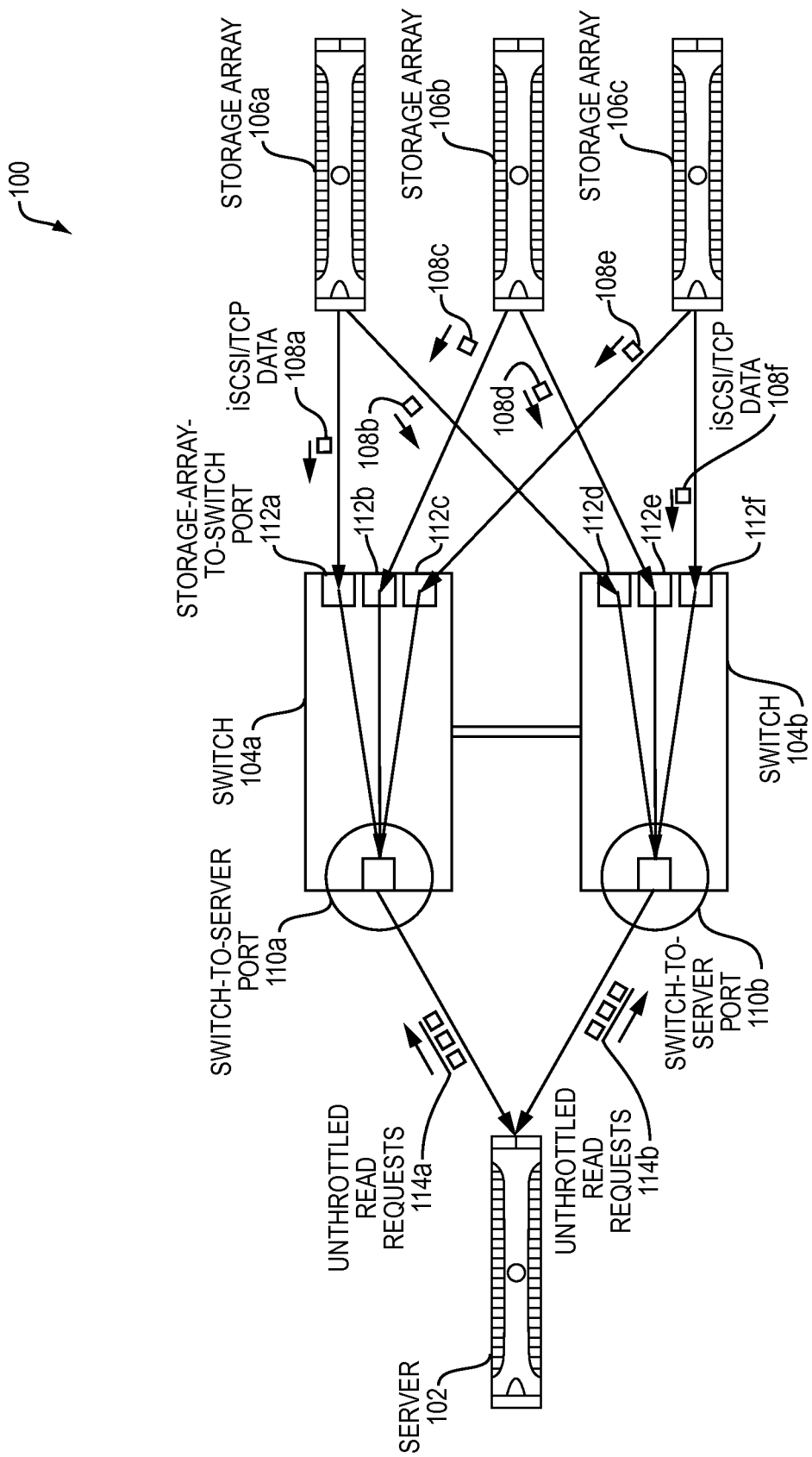
FIG. 1 is a block diagram illustrating an example embodiment of a data center network.

FIG. 1 is a block diagram 100 illustrating an example embodiment of a data center network. The data center network includes a server 102, switches 104a-b, and storage arrays 106a-c. The server 102 is coupled to switches 104a-b via switch-to-server port 110a-b, respectively. The storage array 106a is coupled to switch 104a via storage-array-to-switch port 112a and is coupled to switch 104b via storage-array-to-switch port 112d. The storage array 106b is coupled to switch 104a via storage-array-to-switch port 112b and is coupled to switch 104b via storage-array-to-switch port 112e. The storage array 106c is coupled to switch 104a via storage-array-to-switch port 112c and is coupled to switch 104b via storage-array-to-switch port 112f.

The server 102 issues unthrottled read requests 114a-b to storage arrays 106a-c via switches 104a-b to read data from the storage arrays 106a-c. After receiving the unthrottled read requests 114a-b, the storage arrays 106a-c send iSCSI/TCP data 108a-f to the server 102 through the switches 104a-b. Often, the iSCSI/TCP data 108a-f can require more bandwidth than the server 102 has available for receiving data. In this case, the switches 104a-b can handle such a bandwidth overload by queuing the iSCSI/TCP data 108a-f to be sent to the server 102 later. However, the switches 104a-b can have limited buffer space, and if they run out of memory, for example, packets of the iSCSI/TCP data 108a-f can be lost. Therefore, in an embodiment of the present invention, the server 102 can throttle its outgoing read requests so that incoming data does not exceed the amount of available bandwidth at the server 102.

Figure 2:
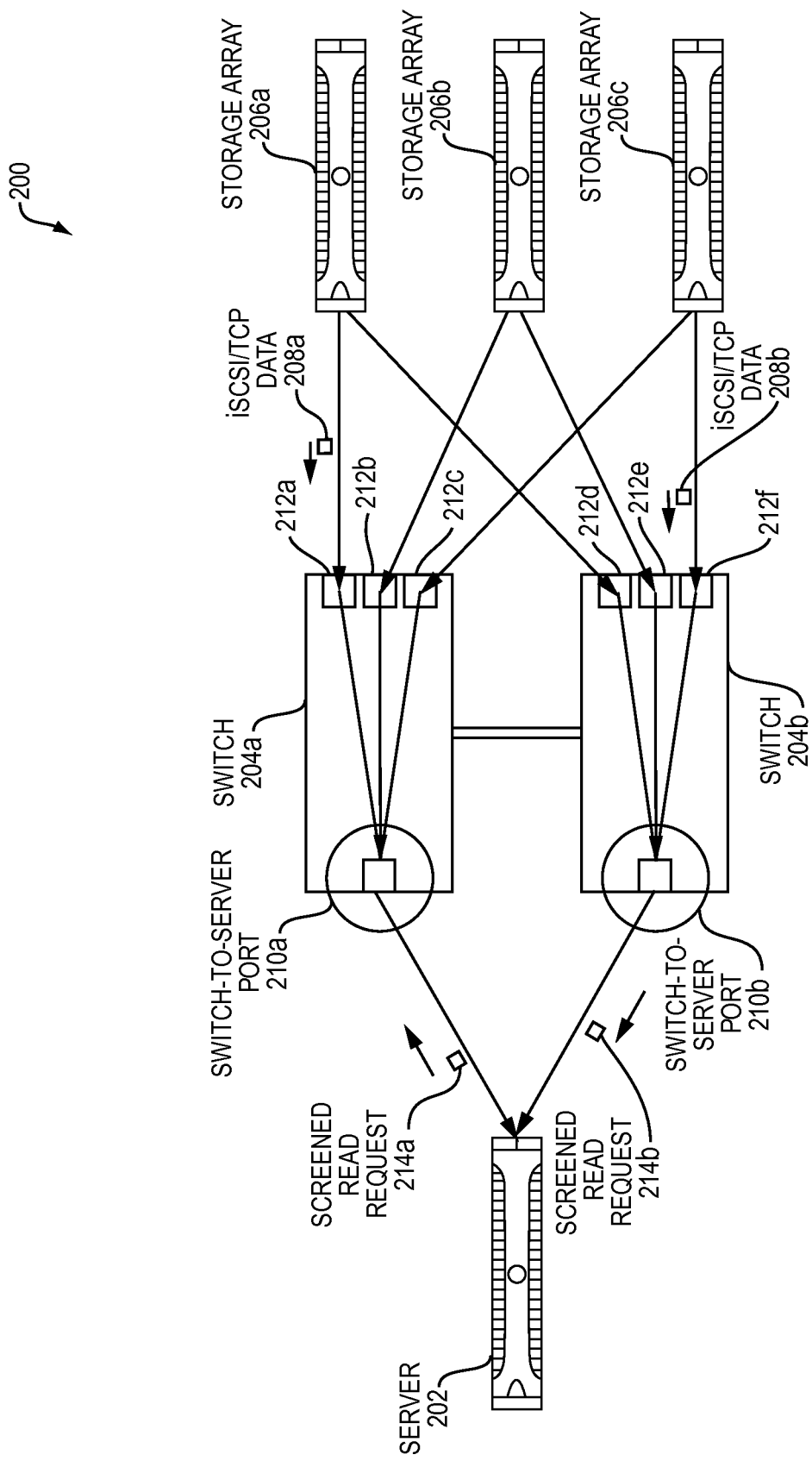
FIG. 2 is a block diagram illustrating a data center network employing an embodiment of the present invention.

FIG. 2 is a block diagram 200 illustrating a data center network employing an embodiment of the present invention. The data center network includes a server 202, switches 204a-b, and storage arrays 206a-c. The server 202 is coupled to switches 204a-b via switch-to-server port 210a-b, respectively. The storage array 206a is coupled to switch 204a via storage-array-to-switch port 212a and is coupled to switch 204b via storage-array-to-switch port 212d. The storage array 206b is coupled to switch 204a via storage-array-to-switch port 212b and is coupled to switch 204b via storage-array-to-switch port 212e. The storage array 206c is coupled to switch 204a via storage-array-to-switch port 212c and is coupled to switch 204b via storage-array-to-switch port 212f.

Figure 3:
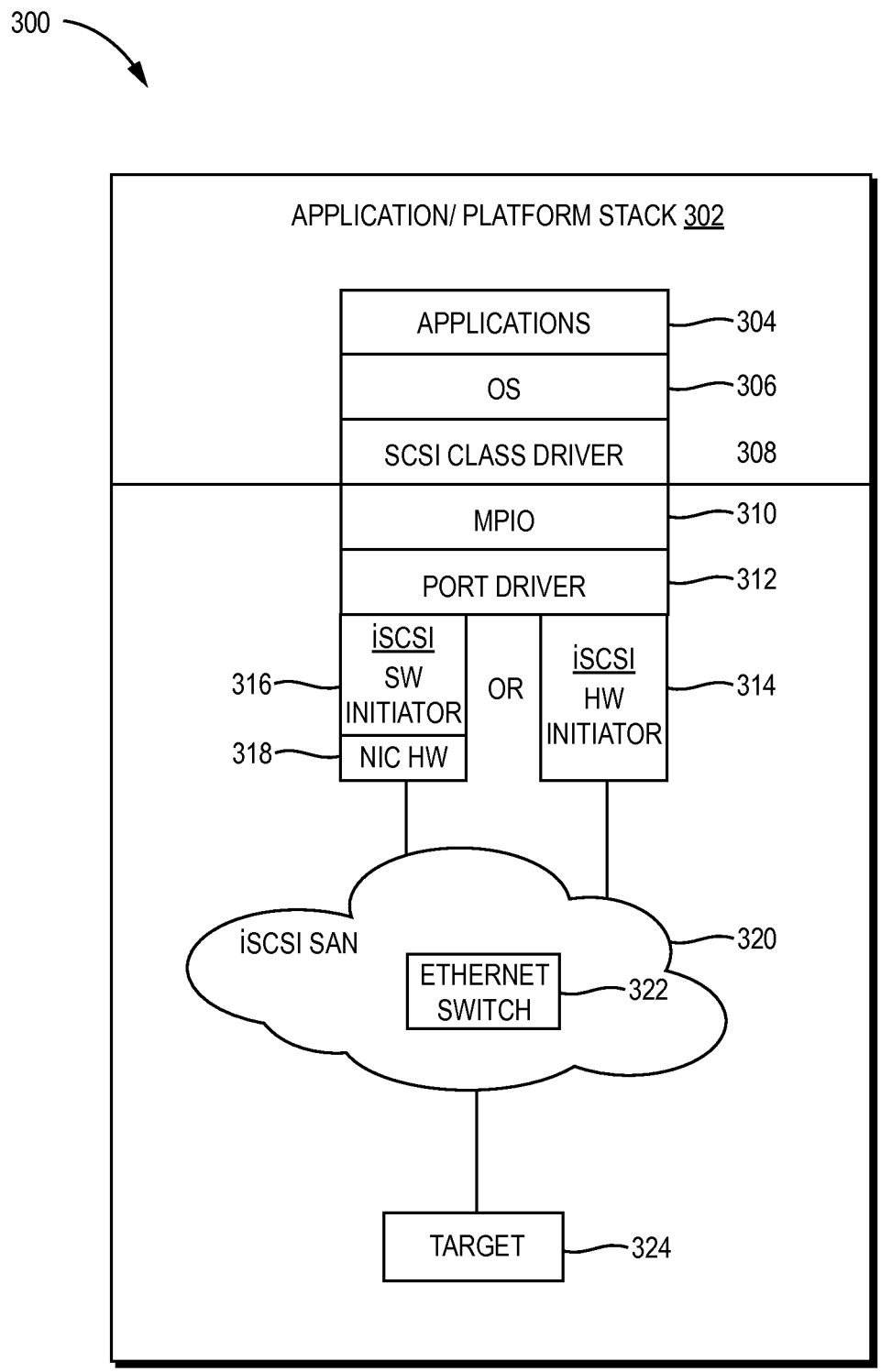
FIG. 3 is a stack diagram illustrating an example embodiment of network layers in an application/platform stack.

In an embodiment of the present invention, the server 202 provides an MPIO layer, or another layer, configured to proactively limit the rate of data transfer requests being issued to the network. FIG. 3 describes networking layers and the MPIO layer in further detail. Major operating systems include framework for storage vendors to write a custom MPIO plugin that takes advantage of vendor specific storage architecture in the backend. For example, MPIO Device-Specific Module (DSM) in Windows and Pluggable Storage Architecture (PSA) multiple multipathing plugins (MPP) in VMware. I/O requests from a SCSI layer are routed via the MPIO plugin for load balancing and path fail-over decisions.

Referring to FIG. 2, the server 202 can access storage arrays 206a or devices (volumes/logical unit numbers (LUNs)) over multiple network paths via the switches 204a-b. In an embodiment of the present invention, the MPIO plugin on the server 202 can throttle the read requests by sending screened read requests 214a-b across the appropriate path based on load balancing/fail-over policies. The MPIO plugin at the server 202 inspects the SCSI read requests for transfer length. The MPIO plugin then limits the number of outstanding read requests to match the aggregate iSCSI Network Interface Card (NIC) port (e.g., each switch-to-server port 210a-b) bandwidth on the server. In effect, the server proactively limits data requests to the available bandwidth at the server's 202 network ports for iSCSI. The server 202 proactively limiting the outgoing read requests prevents storage arrays 206a-c from responding to an excess amount of issued read requests at rates higher than the available bandwidth at the server's 202 iSCSI NIC ports, preventing congestion and TCP incast for the server's 202 network ports. When the server's 202 MPIO plugin delays sending a read request, it can queue the read requests at the sever 202. This is more advantageous than switches 204a-b queue iSCSI/TCP data 208a-b because the server can have more memory and capacity to store the read requests, and also because the read request can be smaller than the iSCSI/TCP data 208a-b responding to it, and thus more read requests can fit in a queue than responses to the read requests.

When server 202 initializes the MPIO plug-in, the MPIO plug-in queries the network stack (Operating System (OS) network driver or NIC adapter driver) for available bandwidth on the network ports connected to storage. For dedicated iSCSI SAN ports (e.g., switch-to-server ports 210a-b), available bandwidth is the Ethernet NIC ports' bandwidth value. For data center bridging network (DCB) enabled converged ports, the available bandwidth is the computed bandwidth based on percentage of link bandwidth allocated to iSCSI. The aggregate bandwidth of all connected iSCSI ports on server is stored in a counter "max rate". Also a "current rate" counter is initialized for storing current outstanding bandwidth utilization for reads (request rate). When a SCSI I/O request arrives at the vendor MPIO plugin, the request is inspected to determine whether it is a read or write I/O request. If it is a read request, the data transfer length requested and is added to the "current rate" counter, if the added value is not greater than "max rate". If the "current rate" is greater than "max rate," then the request is queued at the server 202 and not sent via an available path. If queued requests reach a certain threshold, then a host SCSI BUS BUSY code is sent back to an upper SCSI layer. Once the port driver returns completion status of a SCSI I/O request, the I/O request is inspected to determine if it is a read I/O request, and if so, the data transfer length value is noted and is then subtracted from the "current rate" counter. This releases bandwidth for future read I/O and is done regardless of whether the completion is successful or results in I/O error.

The MPIO plugin and process used within can employ the following definitions and calculations. During MPIO plugin initialization, a max rate can be set as an aggregate available bandwidth of all iSCSI NIC ports connected to the server. The max rate is expressed in terms of bandwidth (e.g., bytes/second). The max rate uses a percentage of the bandwidth allocated for iSCSI in the data center bridging (DCB) network environments and does not include bandwidth of passive paths for fail-over only policies. The MPIO plug-in then initializes a current rate to zero.

Upon a path failure, the MPIO plugin subtracts the available bandwidth of the failed iSCSI NIC port from the max rate and sets that as the new max rate value. Upon a path recovery, the MPIO plugin adds the available bandwidth of the recovered iSCSI NIC port and sets that as the new max rate value.

The MPIO plugin processes SCSI I/O Request by first, checking SCSI Request Block (SRB)/SCSI Command Descriptor Block (CDB) if request is a read I/O request. If the request is a read request, the MPIO plugin checks a data transfer length of request (e.g., using the SRB/CDB). Transfer length is expressed in memory size (e.g., in bytes). Transfer length can then be converted to be a rate, for example, by multiplying it by the speed of the network connection, or the current rate and max rate can be converted to be a data size by dividing them by the speed of the network connection. Using the converted numbers, if the sum of the current rate and the transfer length is less than or equal to the max rate, the current rate adds the transfer length to itself. The MPIO plugin can then process the I/O request to send it on an appropriate network path. If the sum of the current rate and transfer is greater than the max rate, the MPIO plugin can queue the I/O request at the server, before sending it to the iSCSI/TCP layer, or send an SCSI Bus Busy signal to the upper layer.

To complete SCSI I/O processing, the MPIO plugin checks the SRB/CDB to determine if the I/O request is a read I/O request. If it is a read request, the MPIO plugin checks the data transfer length of request (SRB/CDB). The MPIO layer then subtracts the transfer length from the current rate and sets this value as the new current rate.

Upon a path failure, the MPIO plug-in checks whether the failure is on the host NIC, and if so, decrements the failed NICs bandwidth from the "max rate" counter. Decrementing the failed bandwidth limits the max rate even during NIC port failures.

The MPIO plug-in provided by an embodiment of the present invention solves the problem of read I/O bottlenecking data from clustered storage to servers. Write I/O requests, on the other hand, continue to be immediately sent to storage for processing. This improves performance greatly because a majority of data traffic on storage systems is read I/O. A typical use case of a data center network can, on average, have almost 70% of its traffic be read I/O, although different implementations of data center network can have different proportions.

In the case of multiple servers on network, each server 202 throttles based on its maximum bandwidth. The aggregate bandwidth of all servers 202 is higher than the bandwidth of the storage arrays 206a-c. In this case, throttling occurs automatically at the array network layer, since the storage arrays 206a-c cannot send more than their available bandwidth. If each server 202 sends I/O requests to fill its bandwidth capacity, the requests may take longer to complete due to other servers 202 competing for the storage array 206a-c bandwidth. This is the same behavior, even without MPIO based rate limiting. The same applies when a single server 202 bandwidth provides more than storage bandwidth. In addition, when multiple servers 202 are attached to network, they are attached via their own network ports and do not share same ports with each other. Therefore, the MPIO plug-in can prevent fan-in congestion for each server port with this method.

FIG. 3 is a stack diagram 300 illustrating an example embodiment of network layers in an application/platform stack 302. The stack 302, at the server (e.g., server 202), includes an applications layer 302, an operating system (OS) layer 306, and a driver layer 308 (e.g., a SCSI class driver layer). The server can generate a read request from the applications layer 302, which is then sent up the stack via the OS layer 306 to the driver layer 308. The driver layer 308 then sends the read request to an MPIO layer 310, which can be configured with the plug-in described in an embodiment of the present invention. The MPIO layer 310, within the server, calculates whether the sever has enough available bandwidth to be able to receive a response to the read request. If so, the MPIO layer 310 propagates the request through the stack 302, via the port driver 312 and then an iSCSI initiator, which can be either an iSCSI software initiator 316 and NIC hardware 318, or an iSCSI hardware initiator 314. Then, the iSCSI initiator, in either of its forms, propagates the read request to the iSCSI storage area network 320, through an Ethernet switch 322, to a target 324 (e.g., the target storage array). The target 324 can then return the read request to the server over the iSCSI Storage area network 320 and down the stack 302 in the reverse order the read request propagated. The target 324 can return the read request knowing that the server has adequate bandwidth to handle the data because the server has already calculated that it has adequate bandwidth to handle the response.

Figure 4A:
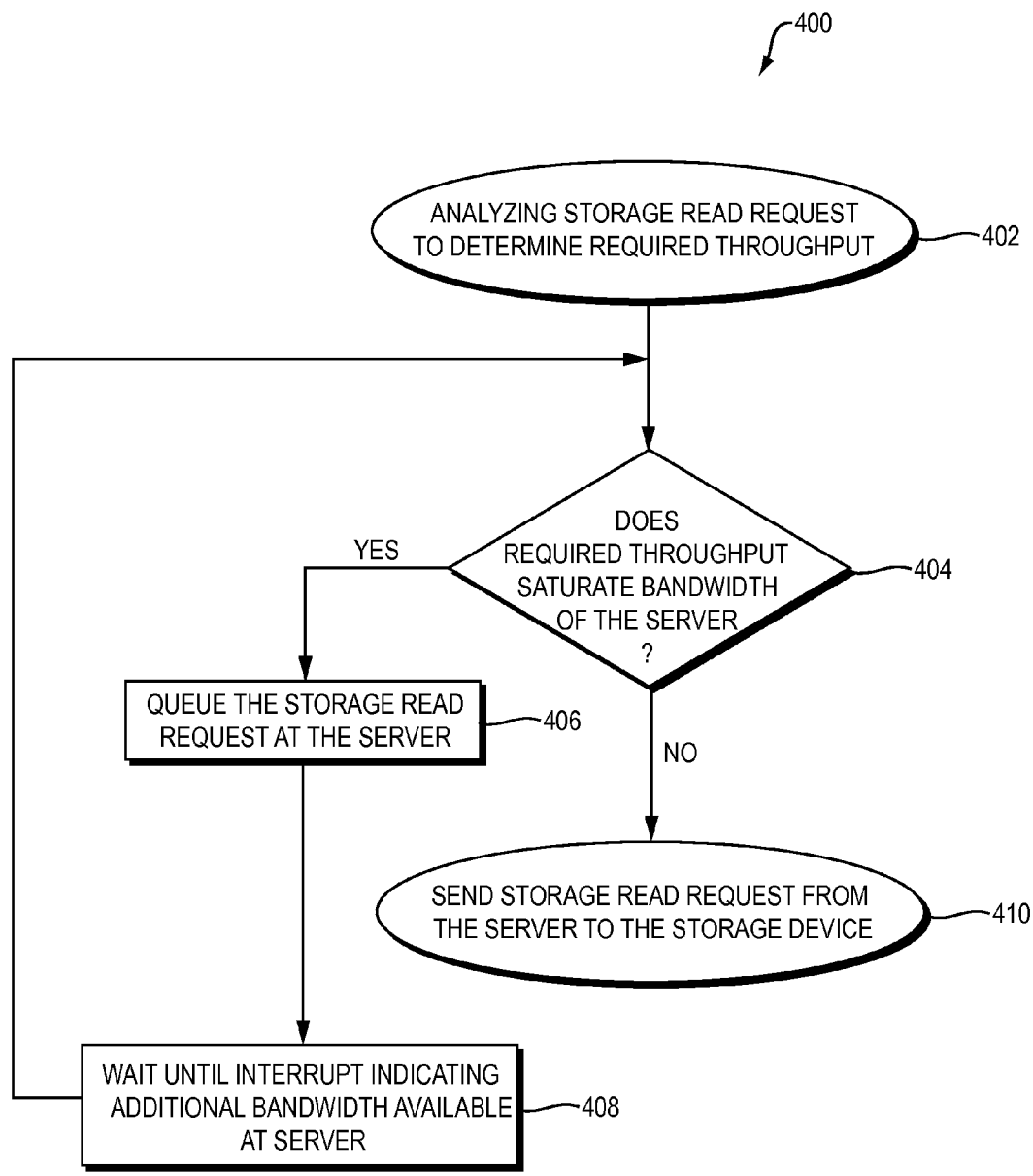
FIG. 4A is a flow diagram illustrating an example embodiment of a process employed by the present invention.

FIG. 4A is a flow diagram 400 illustrating an example embodiment of a process employed by the present invention. First, the process analyzes a storage read request at a server to be sent to a storage device to determine required throughput of the read request upon the storage device returning the requested data of the read request (402). The process determines whether the required throughput saturates the total bandwidth of the server, for example, saturating a port of the server used for receiving iSCSI data (404). If the required throughput does saturate the bandwidth of the server (404), then the server queues the storage read request at the server, for example in a queue or other memory structure (406). Then, the sever can wait until an interrupt or other message that indicates additional bandwidth is available at the server, when previous read request complete or resulted in error or a fixed or variable amount of time (408), and then determine whether the required throughput of the storage read request saturates bandwidth of the sever (404).

On the other hand, if the required throughput of the storage read request does not saturate bandwidth of the server (404), the process sends the storage read request from the server to the storage device (410).

Figure 4B:
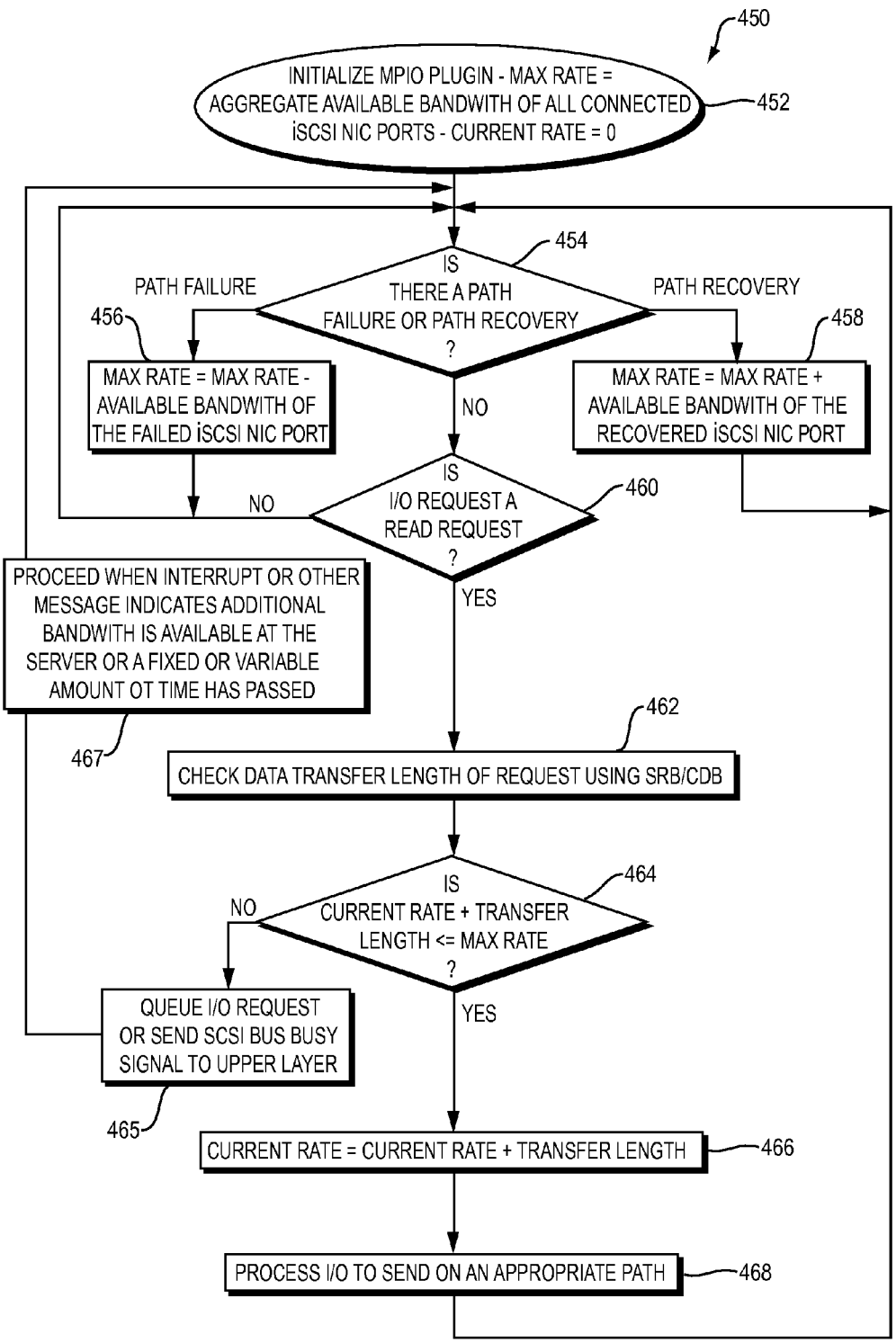
FIG. 4B is a flow diagram illustrating an example embodiment of a process employed by the MPIO plugin to implement the process of FIG. 4A.

FIG. 4B is a flow diagram 450 illustrating an example embodiment of a process employed by the MPIO plugin to implement the process of FIG. 4A. To initialize the plugin, a max rate is set to an aggregate available bandwidth of all connected iSCSI NIC ports (452). A current rate is set to zero (452).

The process then determines whether there is a path failure or path recovery (454). Upon a path failure, the max rate is decreased by the available bandwidth of the failed iSCSI NIC port (456). Upon a path recovery, the max rate is increased by the available bandwidth of the recovered iSCSI NIC port (458).

If there is neither a path failure, in processing SCSI I/O Requests, the MPIO plugin can check SRB/CDB to determine whether the request is a read I/O request (460). If it is a read request, the MPIO plugin uses SRB/CDB to check the data transfer length of the I/O request (462). If the sum of the current rate and transfer length is less than or equal to the maximum rate (464), the current rate is increased by the transfer length (466), and the MPIO processes the I/O request by sending it on an appropriate path to its destination (468). Then, the MPIO plugin can determine whether there is a path failure or path recovery (454).

Otherwise, if the sum of the current rate and transfer length is greater than the maximum rate (464), the MPIO plugin queues the I/O request, or sends a "SCSI BUS BUSY" signal to an upper layer of the network stack (465). Then, the MPIO plugin proceeds upon an interrupt, or other message, indicates additional bandwidth is available at the server or if a fixed or variable amount of time has passed (467). Then, the MPIO plugin can determine whether there is a path failure or path recovery (454).

Figure 4C:
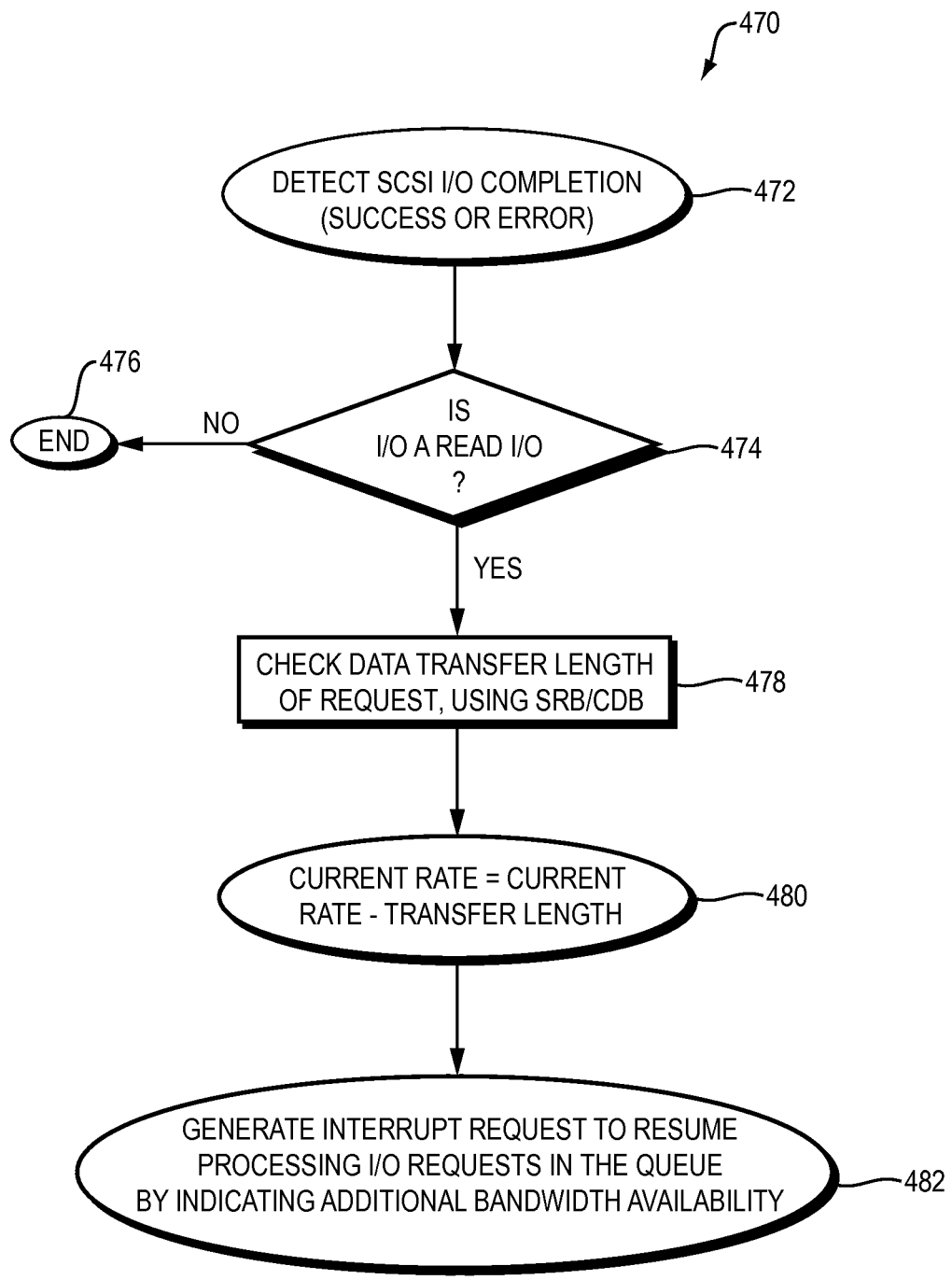
FIG. 4C is a flow diagram illustrating an example embodiment of a process employed by the MPIO plugin to implement the process of FIG. 4A.

FIG. 4C is a flow diagram 470 illustrating an example embodiment of a process employed by the MPIO plugin to implement the process of FIG. 4A. Upon completing SCSI I/O processing, either with a success or an error (472), the MPIO plugin checks if request is read I/O request, using SRB/CDB (474). If it is a read request, the MPIO plugin checks data transfer length of request, using SRB/CDB, (478) and decreases the current rate by the transfer length (480). Then, the MPIO plugin generates an interrupt to resume processing I/O requests in the queue indicating additional bandwidth availability (482). Otherwise, if the request is not a read I/O request, the MPIO plugin performs no action (476).

Figure 5:
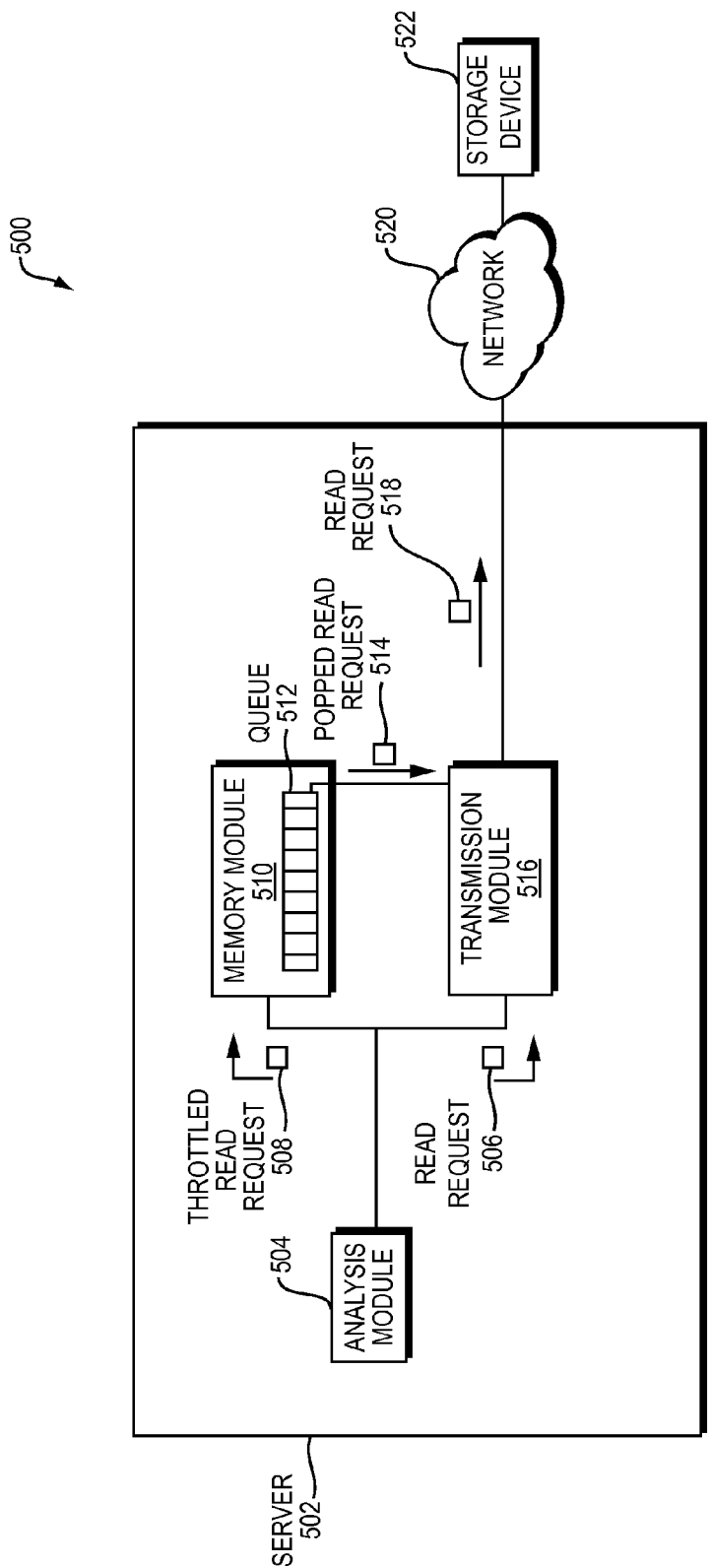
FIG. 5 is a block diagram illustrating an example of a server and storage device employed in an example embodiment of the present invention.

FIG. 5 is a block diagram 500 illustrating an example of a server 502 and storage device 522 employed in an example embodiment of the present invention. The server 502 includes an analysis module 504, memory module 510 and a transmission module 516. Upon the server 502 generating a read request for the storage device 522, the analysis module 504 determines whether to throttle the read request or send the read request to the storage device 522 based on available bandwidth at the server to receive read data from the storage device 522. If the analysis module decides to send the read request, it forwards read request 506 to the transmission module 516, which in turn sends the read request 518 (e.g., read request 506) to the storage device 522 via network 520.

On the other hand, if the analysis module decides to throttle the read request, it sends throttled read request 508 to the memory module 510 to be stored in a queue 512 or other memory structure. The throttled read request 508 is the same as the read request 506, but travels along a different path within the server. The memory module 510 can hold the throttled read request 508 in its queue 512 until it receives an interrupt or other message that indicates additional bandwidth is available at the server when previous read request complete or resulted in error, or a fixed or variable amount of time passes. The memory module 510, upon receiving the interrupt, message, or indication a fixed or variable amount of time passed, can request the analysis module 504 send an indication that the server has enough bandwidth to be able to send the throttled read request 508 being stored in the queue. In one embodiment, the throttled read request 508 can be at the top of the queue 512 or other memory structure, but in other embodiments the analysis module can indicate that other read requests in the queue 512 can be sent. The memory module 510 then can pop a read request from the queue and send the popped read request 514 to the transmission module 516 to be transmitted to the storage device 522. In another embodiment, the popped read request 514 can be sent to the analysis module 504, which can forward it to the transmission module 516 if the server has the required amount of bandwidth.

Figure 6:
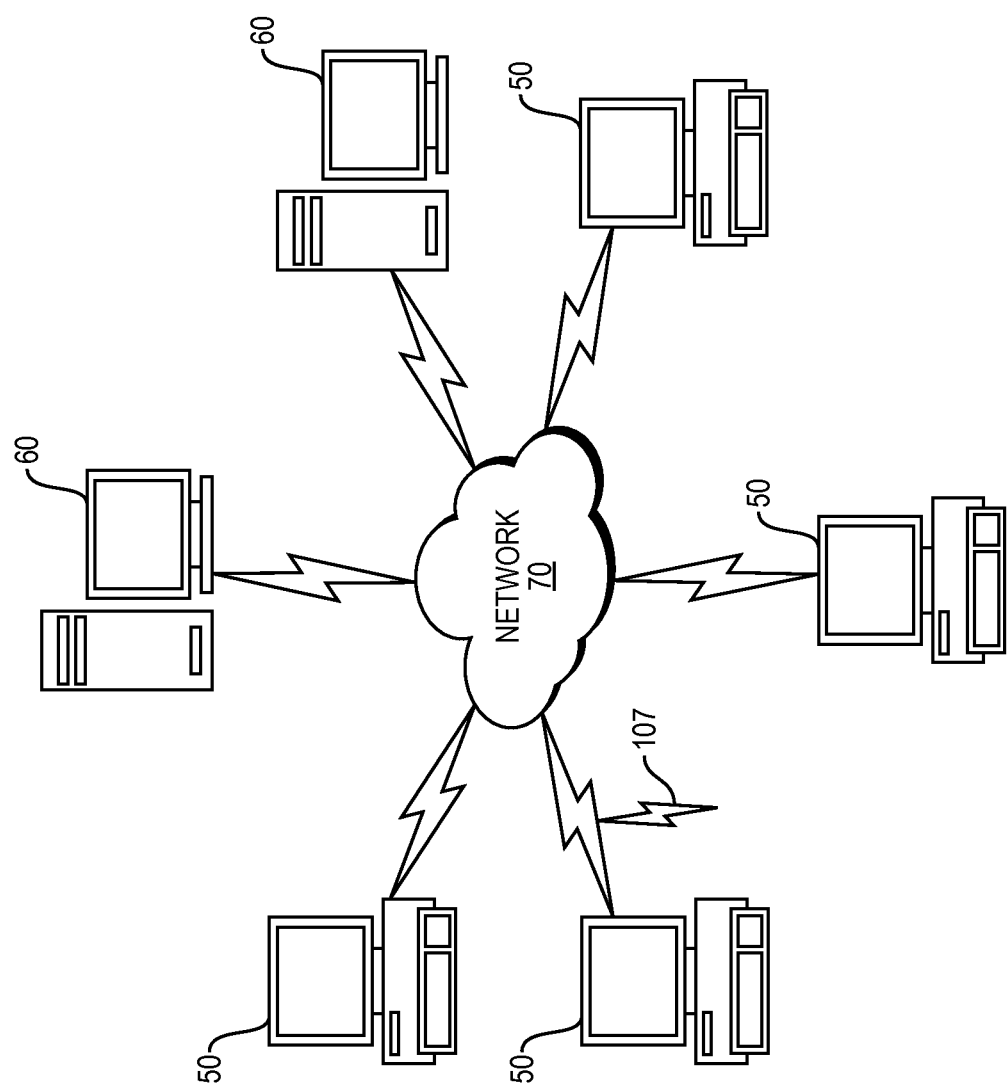
FIG. 6 illustrates a computer network or similar digital processing environment in which embodiments of the present invention may be implemented.

FIG. 6 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

FIG. 7 is a diagram of an example internal structure of a computer (e.g., client processor/device 50 or server computers 60) in the computer system of FIG. 6. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 6). Memory 90 provides volatile storage for computer software instructions 92 and data 94 used to implement an embodiment of the present invention (e.g., selection module, presentation module and labeling module code detailed above). Disk storage 95 provides non-volatile storage for computer software instructions 92 and data 94 used to implement an embodiment of the present invention. A central processor unit 84 is also attached to the system bus 79 and provides for the execution of computer instructions. The disk storage 95 or memory 90 can provide storage for a database. Embodiments of a database can include a SQL database, text file, or other organized collection of data.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of managing inbound throughput for at least one storage read request, the method comprising:
   analyzing, at a server, a given storage read request to determine required network throughput to return data requested by the at least one storage read request on at least one network port of the server, each of the storage read requests being directed to a storage device;
   queuing, at the server, the given storage read request if the required throughput of the given storage read request combined with throughput of outstanding storage read requests previously sent to the storage device saturates the available bandwidth of the network ports of the server; and
   sending the given storage request from the server to the storage device if the required throughput of the storage read request along with throughput of the outstanding read requests is below the level of available bandwidth of the network ports of the server.

2. The method of claim 1, wherein the server presents a platform stack having a plurality of layers, wherein a first of the layers generates the storage read request, and a second of the layers, the second of the layers being higher than the first of the layers in the platform stack, analyzes the storage read request.

3. The method of claim 2, wherein a third layer of the platform stack is configured to send the storage read request to the storage device, the third layer being higher than the first of the layers and the second of the layers in the platform stack.

4. The method of claim 1, wherein analyzing the storage read requests includes:
   determining required throughput at the server; and
   determining whether to queue the given storage read request or send the given storage read request based on a difference between a maximum bandwidth on all of the network ports of the server and a current required throughput.

5. The method of claim 1, wherein the analyzing, queuing and sending occur in a layer before a SCSI carrier layer and after a SCSI request layer.

6. The method of claim 1, wherein the analyzing, queuing and sending occur in a multi-path input/output (MPIO) layer.

7. The method of claim 1, wherein the storage device is a plurality of storage devices, and further comprising:
   limiting network traffic from the plurality of storage devices, based on available bandwidth on at least one of the network ports of the server, by queuing the given storage request from the server.

8. A server for managing inbound throughput for at least one storage read request, the server comprising:
   an analysis module configured to analyze, at a server, a given storage read request to determine required network throughput to return data requested by the at least one storage read request on at least one network port of the server, each of the storage read requests being directed to a storage device;
   a memory module configured to queue, at the server, the given storage read request if the required throughput of the given storage read request combined with throughput of outstanding storage read requests previously sent to the storage device saturates the available bandwidth of the network ports of the server; and
   a transmission module configured to send the given storage request from the server to the storage device if the required throughput of the storage read request along with throughput of the outstanding read requests is below the level of available bandwidth of the network ports of the server.

9. The system of claim 8, wherein the server presents a platform stack having a plurality of layers, wherein a first of the layers generates the storage read request, and a second of the layers, the second of the layers being higher than the first of the layers in the platform stack, analyzes the storage read request.

10. The system of claim 9, wherein a third layer of the platform stack is configured to send the storage read request to the storage device, the third layer being higher than the first of the layers and the second of the layers in the platform stack.

11. The system of claim 8, wherein the analysis module is further configured to determine throughput at the server and determine whether to queue the given storage read request or send the given storage read request based on a difference between a maximum bandwidth on all of the network ports of the server and a current required throughput.

12. The system of claim 8, wherein the analyzing, queuing and sending occur in a layer before a SCSI carrier layer and after a SCSI request layer.

13. The system of claim 8, wherein the analyzing, queuing and sending occur in a multi-path input/output (MPIO) layer.

14. The system of claim 8, wherein the storage device is a plurality of storage devices, and the analysis module is further configured to limit network traffic from the plurality of storage devices, based on available bandwidth on the at least one network ports of the server, by queuing the given storage request from the server.

15. A non-transitory computer-readable medium configured to store instructions for managing inbound throughput for at least one storage read request, the instructions, when loaded and executed by a processor, causes the processor to:
   analyze, at a server, a given storage read request to determine required network throughput to return data requested by the at least one storage read request on at least one network port of the server, each of the storage read requests being directed to a storage device;
   queue, at the server, the given storage read request if the required throughput of the given storage read request combined with throughput of outstanding storage read requests previously sent to the storage device saturates the available bandwidth of the network ports of the server; and
   send the given storage request from the server to the storage device if the required throughput of the storage read request along with throughput of the outstanding read requests is below the level of available bandwidth of the network ports of the server.

16. The non-transitory computer-readable medium of claim 15, wherein the server presents a platform stack having a plurality of layers, wherein a first of the layers generates the storage read request, and a second of the layers, the second of the layers being higher than the first of the layers in the platform stack, analyzes the storage read request.

17. The non-transitory computer-readable medium of claim 16, wherein a third layer of the platform stack is configured to send the storage read request to the storage device, the third layer being higher than the first of the layers and the second of the layers in the platform stack.

18. The non-transitory computer-readable medium of claim 15, wherein analyzing the storage read requests includes:
   determining throughput at the server, and
   determining whether to queue the given storage read request or send the given storage read request based on a difference between a maximum bandwidth on all network ports of the server and a current required throughput.

19. The non-transitory computer-readable medium of claim 15, wherein the analyzing, queuing and sending occur in a layer before a SCSI carrier layer and after a SCSI request layer.

20. The non-transitory computer-readable medium of claim 15, wherein the analyzing, queuing and sending occur in a multi-path input/output (MPIO) layer.

* * * * *